(12) United States Patent
Nydegger

(10) Patent No.: US 6,168,105 B1
(45) Date of Patent: Jan. 2, 2001

(54) FISHING REEL WITH MULTIPLIER FOR INCREASING LINE WINDER SPEED

(76) Inventor: Francis Nydegger, Via Industria 41, 6512 Giubiasco (CH)

( * ) Notice: Under 35 U.S.C. 154(b), the term of this patent shall be extended for 0 days.

(21) Appl. No.: 09/308,492

(22) PCT Filed: Nov. 14, 1997

(86) PCT No.: PCT/IB97/01437

§ 371 Date: May 20, 1999

§ 102(e) Date: May 20, 1999

(87) PCT Pub. No.: WO98/21942

PCT Pub. Date: May 28, 1998

(30) Foreign Application Priority Data

Nov. 21, 1996 (CH) .................................................... 2878/96

(51) Int. Cl.$^7$ ............................................................... A01K 89/00
(52) U.S. Cl. ............................ 242/255; 242/296; 242/317
(58) Field of Search ..................................... 242/317, 255, 242/260, 263, 264, 296, 305

(56) References Cited

U.S. PATENT DOCUMENTS

| 3,089,663 | * | 5/1963 | Kirby, Sr. ......................... 242/317 X |
| 3,572,607 | | 3/1971 | Wilson . |
| 3,806,060 | * | 4/1974 | Valentine ............................. 242/255 |
| 4,796,831 | * | 1/1989 | Sheppard ......................... 242/263 X |
| 4,951,899 | * | 8/1990 | Moosberg ............................ 242/255 |
| 5,259,566 | * | 11/1993 | Kalle ................................ 242/317 X |
| 5,947,398 | * | 9/1999 | Yeh ................................. 242/317 X |

FOREIGN PATENT DOCUMENTS

| 2002504 | 7/1971 | (DE) . |
| 2094121 | 9/1982 | (GB) . |

* cited by examiner

Primary Examiner—Donald P. Walsh
Assistant Examiner—Emmanuel M. Marcelo
(74) Attorney, Agent, or Firm—Young & Thompson

(57) ABSTRACT

In a fishing reel (1) for fly-fishing having a body (2), a line winder (3) joined to the body (2) rotating around an axis (x—x) and a handle (4) perpendicular to the axis of the fishing rod to rotate the line winder (3) between the handle (4) and the line winder (3), multiplier devices (5, 6) are incorporated to multiply the ratio between the rotation speed of the line winder (3) and that of the handle (4) to a preset degree.

10 Claims, 5 Drawing Sheets

FISHING REEL WITH MULTIPLIER FOR INCREASING LINE WINDER SPEED

BACKGROUND AND SUMMARY OF THE INVENTION

This invention concerns the fishing reel sector and more particularly reels used for fly-fishing.

The latter consist of a body and line winder fixed to them, that rotates on the inside along an axis perpendicular to the axis of the fishing rod, equipped with a handle for actuation.

This type of fishing reel is used virtually only to re-wind the line when no traction is exerted on it, which means that, either due to the lack of an adjustable clutch or due to the intrinsic slowness of retrieval, the angler is obliged to retrieve the line manually after hooking a fish, supporting the coils on the ground next to his feet, which has disadvantages such as the risk of treading on the line, tangling it or the line itself becoming entangled on bushes, rocks or other uneven surfaces. Hooking a fish manually is often problematic.

To avoid these disadvantages, the inventor of the present invention has designed a novel fishing reel for fly-fishing.

With this fishing reel, the line retrieval speed is increased by the introduction of a gear transmission between the handle and the line winder.

The prior art comprises several examples of reels, wherein multiplier devices are employed for solving the same kind of problems, but such examples differ from a reel according to the invention as regards the disposition and the interconnection of the various parts constituting said multiplier devices, so that said examples cannot obtain many relevant advantages offered by the present invention.

One of the aforementioned examples is described by Patent DE-A-2002504.

BRIEF DESCRIPTION OF THE DRAWINGS

The advantages that can be obtained with reel according to the present invention, along with others that can be achieved with other forms of construction, are described below, with reference to the attached drawings, which represent.

DESCRIPTION OF THE PREFERRED EMBODIMENTS

Figure 1:
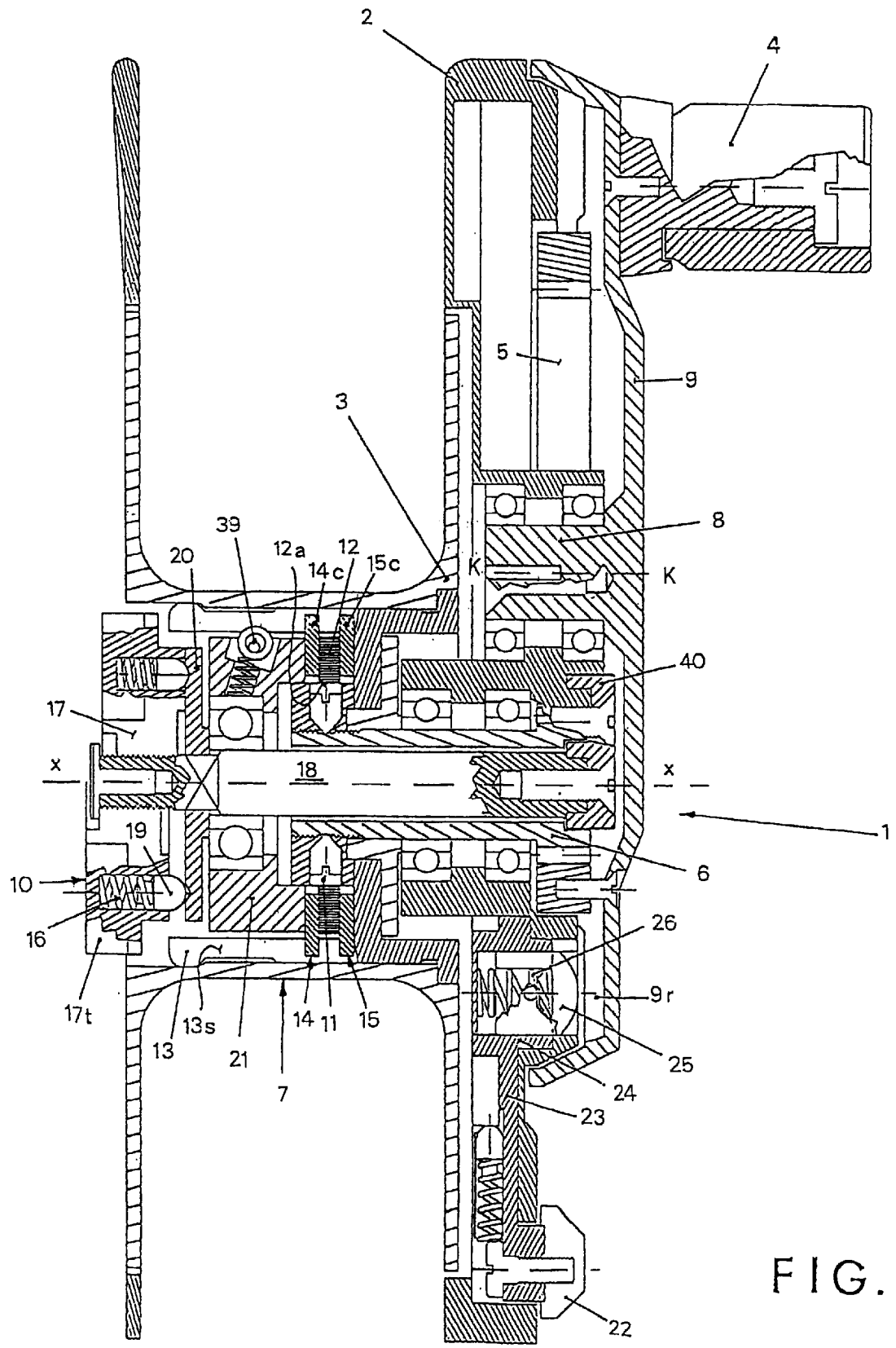
FIG. 1, cross-section of the fishing reel as per the invention in a preferred form of construction, incorporating the following amongst other things: adjustable clutch, a 3-position winder, and a device that also acts as a unidirectional exhaust for the winder.

Looking first at FIG. 1, it will be noted that a disc element 9 equipped with spokes 9r is fitted to an eccentric rotating handle 4 of known type.

The disc element 9 hinged on a pin 8 fixed to the body 2 of the fishing reel 1, has a toothed rim 5 coaxial to it and rotates around an axis k—k. The pin 8 is parallel to a rotating support element 7 on which a line winder 3 is fitted; a pinion 6 is keyed to this rotating element 7, comprising a cylindrical dome 13, and this pinion, which rotates around an axis x—x parallel to said axis k—k, engages on the inside, with the appropriate transmission ratio, with the toothed rim 5. By rotating the disc element 9 and toothed element 5 integral with it by means of the handle 4, the pinion 6 rotates in gear and as does the line winder 3, with consequent fast winding of the line (not shown) on this.

The inventor suggests a multiplier ratio between the rim 5 and pinion 6 of 3 or more.

In fishing reels in general, and hence in the reel as per the invention as well, an insert needs to be provided to prevent rotation of the line winder 3 and inadvertent winding of the line when traction is exerted upon it (for example by a fish biting).

To this effect, the inventor has designed a device particularly well suited to a fishing reel as described thus far, but also applicable to reels of different types, which, when mounted on the body 2 of the reel 1 in a position facing the disc element 9 equipped with spokes 9r, by selectively varying its position in relation to the latter, interferes or otherwise with the spokes 9r such that it scrapes against it, or not as the case may be, emitting a warning sound, or not, or preventing rotation of the disc element in one of the two directions.

Figure 2:
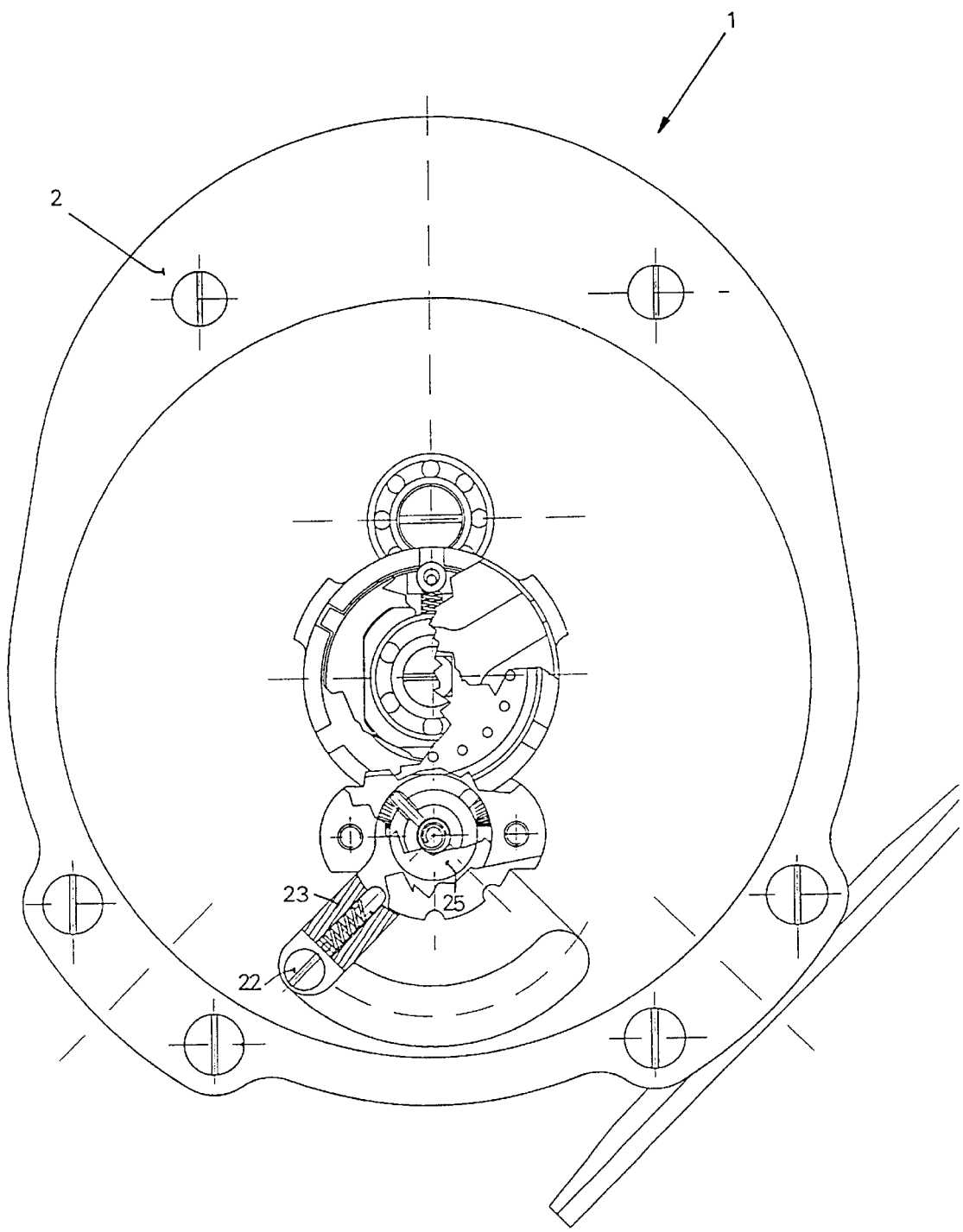
FIG. 2, a side view of the fishing reel in FIG. 1 in partial section to reveal the aforesaid device that acts as an exhaust.

In the example shown (see FIGS. 2 and 3), this device consists of a rotating arm 23 ending in a cap 24 accommodating a pawl 25 pushed by a spring 26. This pawl 25 is equipped with two spigots 27, 28 which, during rotation of the arm 23, slide on the inclined surfaces 29 of a fixed counter element 30 operating in the same way as a cam, and during this sliding movement, raise or lower the said pawl 25 vertically.

The top of the latter is profiled to engage against the edge of one or more of the spokes 9r, as appropriate, of the disc element 9 which it is facing.

Figures 3A, 3B:
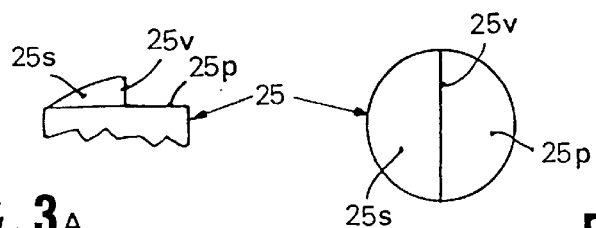
FIG. 3a, 3b, side view and plant view of the pawl forming part of the device in FIGS. 2 and 3.

According to a preferred form of construction, the inventor envisages profiling the top with a flat section 25p. (see FIGS. 3a, 3b) and a spherical semi-domed section 25s projecting above the flat section 25p which is adjoined by a vertical surface 25v, perpendicular to the latter.

The pawl 25 is joined to the rotating arm 23 such that, due to the effect of spigots 27, 28 sliding on the said inclined surfaces 29, the following three configurations are obtained a) the pawl 25 is projecting to the minimum extent in relation to the cap 24 (with the arm 23 in position 0) and thus does not interfere with the spokes 9r, which can rotate freely without producing a noise;

b) the pawl 25 is projecting to the maximum extent in relation to the cap 24, with the arm 23 in position B in which the said vertical surface 25v of the top 25 is perpendicular to the edge of one spoke 9r with which it comes into contact: in this case all the spokes 9r encounter the sloping spherical surface of the semi-domed part 25s as the disc element 9 rotates, and pass over it without problem, pressing it so that the pawl 25 re-enters the cap 24, pressing on the spring 26 which, once a spoke 9r has passed, returns the pawl to the initial position with maximum projection outside.

The rotary motion of the disc element 9 is not therefore obstructed, but the condition is indicated by the noise emitted by the contact of pawl 25 with each of the spokes with which it comes into contact in succession.

Figure 3:
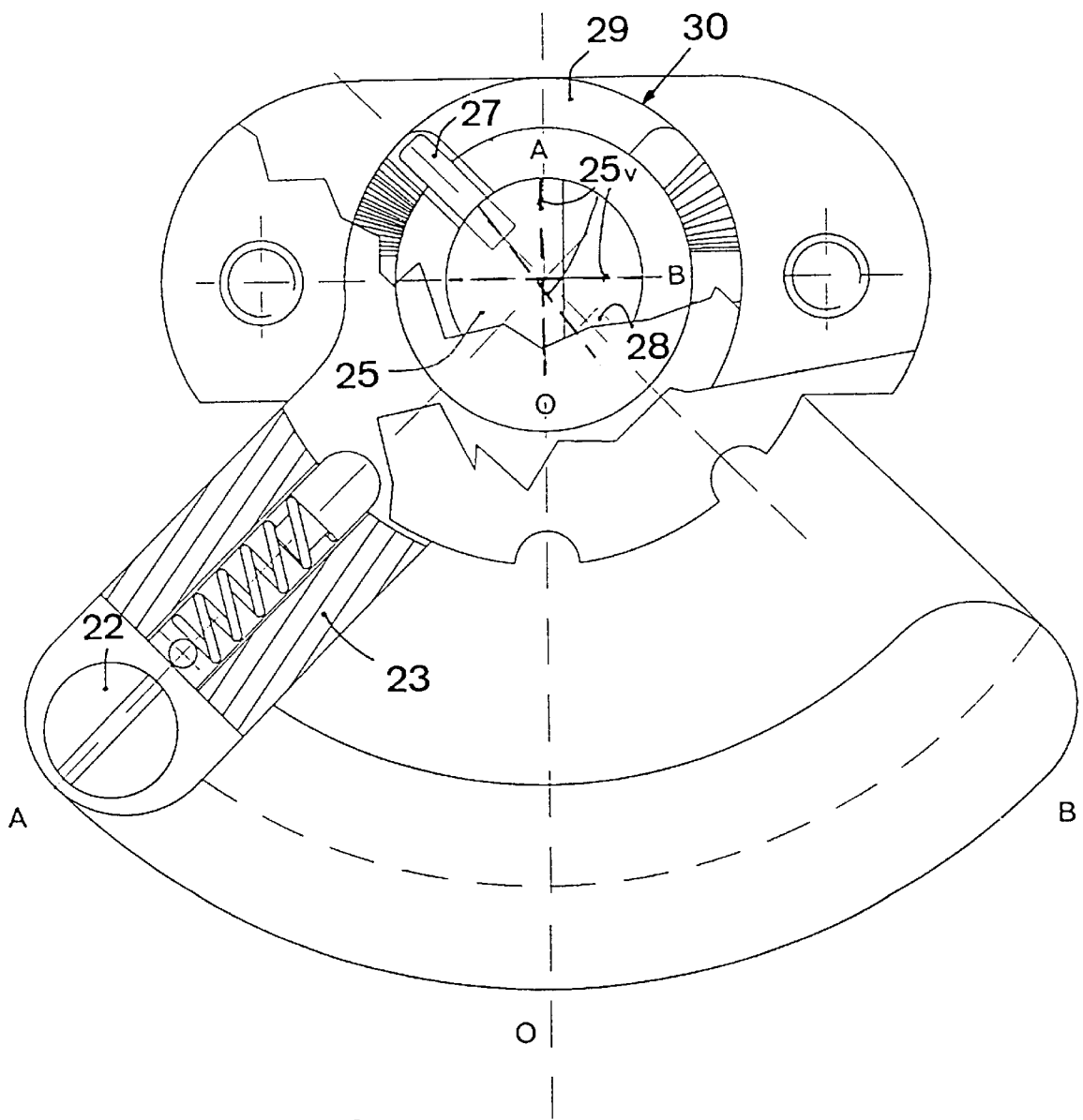
FIG. 3, and enlarged front view of the device in FIG. 2.
Figure 4:
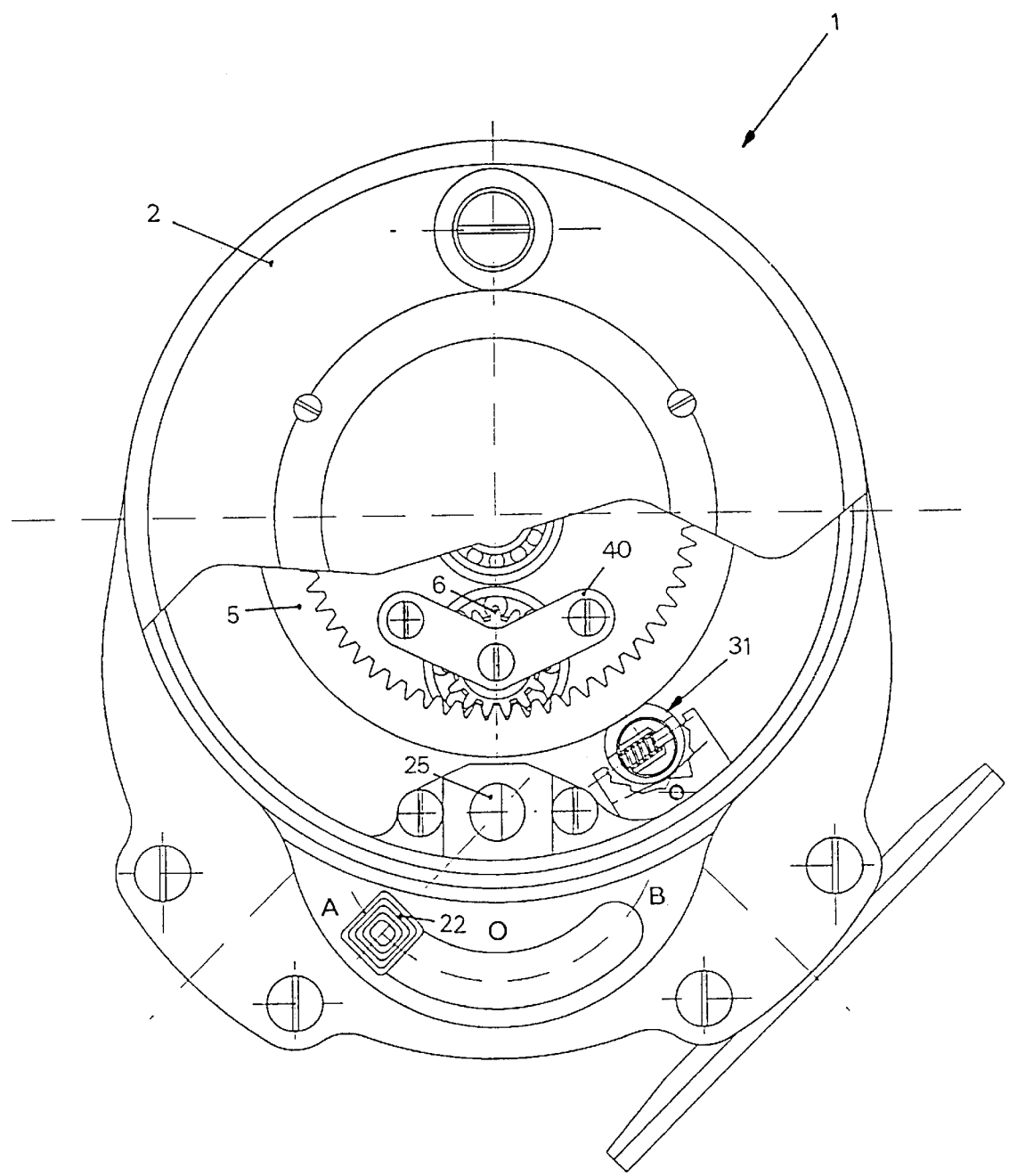
FIG. 4, the front view of this fishing reel in partial section to show the rim/pinion coupling and the 3-position winder brake.

Finally, if arm 23 is in position A, with the vertical surface 25v of the top of the pawl 25 arranged as shown in FIG. 3, and the pawl is in the maximum projection position, this vertical surface 25 faces and is parallel to the edge of the first spoke 9r with which it come into contact, blocking it and preventing the rotary movement of the disc element 9, and thus the part integral with this in rotation as well, which acts as a rotary support 7 for the line winder 3.

This prevents the line from unwinding due to rotation of the line winder 3, unless a clutch device is fitted.

The inventor has designed a clutch device 10 to this effect, which can be fitted to the fishing reel 1 of the invention or other of similar type, which, with regard to the present state of technology, has the advantage of being easy to adjust even when the line is unwound suddenly and energetically, in that the part that needs to be gripped to adjust the clutch resistance does not rotate with it or with the line winder, and this adjustment procedure is thus very easy.

This advantage is achieved with the new design on which the inventor's clutch is based and by the arrangement of the component parts.

The clutch device in question can be seen in FIG. 1.

The pinion 6 is fixed to the body 2 of the fishing reel 1 by means of an intermediate support 4 or with a pin 18 on which the said pinion 6 is keyed, or a profiled element 11 whose profile is other than circular, so that it can engage in an aperture of complementary shape provided in a drive element 12 which may be integral with the line winder 3, by adjusting the friction between this and one or more parts integral with a cylindrical dome 13, lying coaxial to the x—x axis of rotation of the pinion 6, to which the said line winder 3 is fitted.

In the form of construction shown in FIG. 1, the cylindrical dome 13 has several radial grooves 13s, in which projections 14c, 15c made on the outside of two rings 14, 15 with the drive element 12 inserted between, can be introduced so that they slide. Due to these projections 14c, 15c, the cylindrical dome 13 is integral with these rings 14, 15, on which the adjustable thrust exerted by several pressure elements acts, consisting in the present case of three struts 19 with rounded points pushed by the same number of springs 16 fitted in a disc 17 coaxial to the dome 13 screw-fixed to the said pin 18, which, as stated, is in turn fixed to the body 2 of the reel 1.

By altering the torque on the screws on disc 17, the compression of the springs 16 can be altered, with a corresponding pressure on the rings 14, 15 and on the interposed drive element 12, which, with its aperture 12a, engages around the profiled element 11 integral with the pinion 6, and thus the disc element 9.

Finally, by adjusting the torque on the screws of the said disc 17, it is possible to adjust slippage between the cylindrical dome 13, integral with the line winder 3, and the drive element 12, integral, as stated, with the disc element 9 when the latter is kept in the locked position.

To facilitate this adjustment procedure, the disc 17, which as we have seen does not rotate with the line winder 3, has projecting parts designed to grip for this.

The inventor has established that to improve the service life and functionality of the assembly, it is useful to insert, in sequence, a dividing panel 20 and a small bearing 21 to act as a thrust bearing, between the said struts 19 and the ring 14 immediately downstream.

It is advantageous to fit a flexible indicator 39 in this bearing 21, projecting radially to a pre-determined degree from this which emits an acoustic signal indicating the speed of this rotation when it encounters the radial grooves 13s of the cylindrical dome 13 during its relative rotation.

When the line is wound under traction with the friction disengaged, in this reel as in other types, it often happens that once the line winder 3 starts to rotate, it continues to rotate by inertia more than is necessary, paying out too much line so that the coils which become sack as they unwind more often than not lie haphazardly, becoming entangled and enmeshed, resulting in a considerable amount of time wasted while the angler correctly re-positions it on the line winder 3.

To remedy this problem, the inventor of this invention has designed a device which incorporates a means of selectively braking the line winder 3 in one of the two directions of rotation or in neither of these.

This device (see FIGS. 4 and 5A,5C,5F)consists of a hollow floating drum 32 fitted around a rotating cylindrical support 33 fixed to the body 2 of the reel 1.

The centre C of the floating drum 32 is positioned at a distance d from the smooth outer surface 5e of the said toothed rim 5 of substantially smaller radius r than the drum 32 itself, which is profiled on the part facing this surface 5e so that it matches it perfectly.

In the aforementioned rotating cylindrical support 33 is a pin 34 which passes through its centre C, perpendicular to the internal surface of the floating drum 32. Inside this pin 34 a spring 35 is actuated, housed in the rotating cylindrical support 33, which pushes it axially outwards, i.e towards the said inside surface of the drum 32.

The cylindrical support 33, which is fitted to the body 2 such that it can rotate has a means (for example a notch for a screwdriver on the back) of orientating it in the required direction, thus orientating the direction of thrust exerted by pin 34 on the inside of the floating drum 32.

Figure 5F:
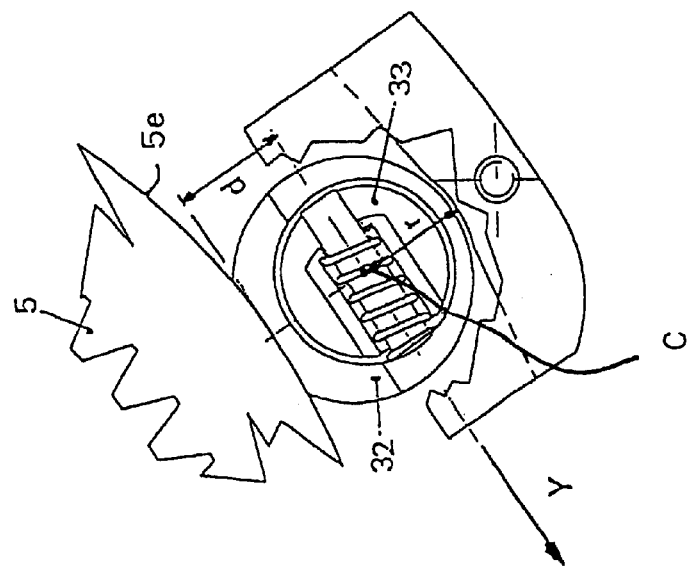
FIG. 5A, 5C, 5F, enlarged side sectional views of this 3-position winder brake.
Figure 5C:
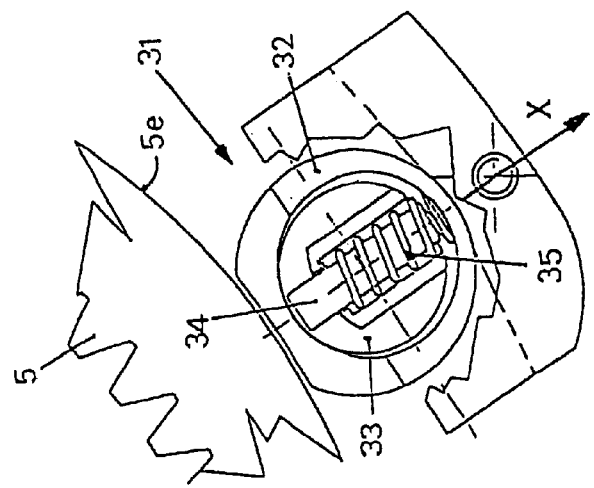

As the latter is fitted inside the rotating support 33 with pre-determined play (hence its definition as "floating"), depending on the direction of this thrust, it moves in relation to the outer surface 5e of the toothed rim 5, and the part of it which is of complementary profile, acts as a floating stock of non-uniform thickness which, when driven by friction by rotation of the toothed rim 5, tends to penetrate laterally in one of the two directions between the latter and the rotating support 33 when transverse thrust is applied to it by the pin 34, but tends to move away in parallel from the outer surface 5 of the said toothed rim 5 when a thrust perpendicular to this but suitably orientated is applied to it (downwards in FIG. 5c).

In the case of lateral thrust to the right (looking at the drawings), the toothed rim 5 is braked as it rotates anti-clockwise, whereas it is braked when rotating clockwise if this lateral thrust is applied to the left.

In the case in question of perpendicular thrust, however, there is no braking effect on the toothed rim 5, irrespective of the direction of rotation.

Figure 5A:
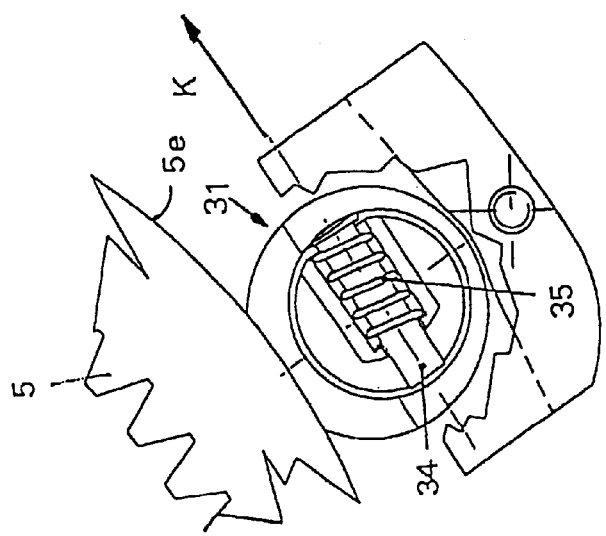

FIGS. 5A, 5C, 5F show the positions of the pin 34 in the following cases, respectively: lateral thrust to the right, perpendicular thrust, lateral thrust to the right.

Arrows K, X and Y indicate the directions of thrust exerted by the pin 34.

Various modifications can be made to the fishing reel as per the invention and to each of its component parts. Constructions obtained by this are also covered by the protection granted by this application for patent where they reflect the provisions of the attached claims.

It will be appreciated that in the fishing reel as per the invention, all the devices are such that their adjustment and effect can be obtained irrespective of the position of the reel to the right or left of the fishing rod for right-handed or left-handed anglers respectively.

What is claimed is:

1. Fishing reel (1) for fly-fishing, comprising a body (2), a line winder (3) joined to the body (2) rotating around an axis (x—x), and a handle (4) that rotates the line winder (3), wherein between the handle (4) and the line winder (3) multiplier devices (5, 6) are incorporated that multiply the ratio between the rotating speed of the line winder (3) and that of the handle (4) to a pre-determined degree, wherein a rotation axis (k—k) of said handle (4) is parallel and not coincident with respect to the rotation axis (x—x) of said line winder (3), further comprising means (31) for selective braking of the line winder (3), wherein said selective braking means comprises a floating hollow drum (32) located inside a rotating cylindrical support (33) fixed to the body (2), a center C of the floating drum (32) being positioned at a distance (d) from an outer surface (5e) of a toothed rim of said multiplier devices, said distance (d) being less than a radius (r) of the drum (32), the part of said drum facing the said surface (5e) being profiled such that it complements toothing of said toothed rim, with a pin (34) fitted inside said rotating cylindrical support (33), this pin being perpendicular to an inside surface of the floating drum (32) and thrust against it in an axial direction by a spring (35), the orientation of said rotating cylindrical support (33) being adjustable so that the thrust can be applied in a preset direction.

2. Fishing reel (1) for fly-fishing, comprising a body (2), a line winder (3) joined to the body (2) rotating around an axis (x—x), and a handle (4) that rotates the line winder (3), wherein between the handle (4) and the line winder (3) multiplier devices (5, 6) are incorporated that multiply the ratio between the rotating speed of the line winder (3) and that of the handle (4) to a pre-determined degree, wherein a rotation axis (k—k) of said handle (4) is parallel and not coincident with respect to the rotation axis (x—x) of said line winder (3), wherein said multiplier devices comprise a toothed rim (5) with internal toothing, that rotates around the axis (k—k) of said handle and a pinion (6) engaging inside said toothed rim (5) with a predetermined transmission ratio, said pinion (6) rotating around the axis (x—x) of said line winder and being integral with a rotating support element (7) fixed to the line winder (3), said toothed rim (5) being fixed to a disc element (9) which rotates on a pin (8) parallel to said rotating support element (7), and the handle (4) being joined to the toothed rim (5) in an eccentric position.

3. Fishing reel as per claim 2, further comprising devices (22) mounted on the body (2) in a first position opposite said disc element (9) with spokes (9r), for selectively modifying the first position in relation to the disc element.

4. Fishing reel as per claim 3, in which said devices (22) for selectively modifying the first position in relation to the disc element (9) comprise a rotating arm (23) ending in a cap (24) in which a pawl (25) is housed driven by a spring (26) and provided with two spigots (27, 28) which, as the arm (23) rotates, slide on inclined surfaces (29) of a fixed counter element (30) acting as a cam by raising or lowering the pawl (25) vertically, the latter having a profiled top such that it engages with the edge of at least one of the spokes (9r) of said disc element (9) preventing it from rotating in a preset direction, and not obstructing it from moving in the opposite direction, when the pawl (25) is in a second position in which it projects to the maximum extent from said cap (24).

5. Fishing reel as per claim 4, in which a top of the pawl (25) is profiled with a flat section (25p) and a spherical semi-domed section (25s) raised in relation to the flat section (25p) to which it is joined with a vertical surface perpendicular to the latter.

6. Fishing reel as per claim 5, in which said rotating arm (23) has devices (36) that are reversible for keeping it fixed in at least three predetermined positions.

7. Fishing reel as per claim 2, in which the handle (4) is fixed eccentrically to a disc element (9) integral with said toothed rim (5).

8. Fishing reel as per claim 2, in which the ratio between the rotation speed of the line winder (3) and the handle (4) is 3 or more.

9. Fishing reel as per claim 2, in which an adjustable clutch (10) is fitted between said rotating support element (7) in which said pinion (6) is keyed and the line winder (3).

10. Fishing reel as per claim 9, in which the said pinion (6) is fixed to said body (2) such that it can rotate around the axis (x—x) of said line winder integrally with a profiled element (11).

* * * * *